2,861,076
Patented Nov. 18, 1958

2,861,076
PROCESS FOR THE PREPARATION OF 1:2:4-TRIAZOLE-3-THIOLS

Edward Bowes Knott and Leslie Alfred Williams, Wealdstone, England, assignors to Eastman Kodak Company, Rochester, N. Y., a corporation of New Jersey No Drawing. Application April 29, 1957
Serial No. 655,512

Claims priority, application Great Britain June 14, 1956

7 Claims. (Cl. 260—288)

This invention relates to the preparation of 1:2:4-triazole-3-thiols, especially those having a monocyclic or bicyclic nucleus fused-on at the 4:5-positions.

The novel compounds of our invention can advantageously be represented by the following general formula:

(I)
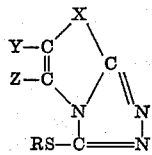

wherein X represents a vinylene group (—CH=CH—), a sulfur atom, an oxygen atom, a —NH— group or a —CR'=N— group (R' representing a hydrogen atom or an alkyl group, such as methyl, carboxymethyl, ethyl, propyl, butyl, etc., especially an alkyl group containing from 1 to 4 carbon atoms), Y and Z represent hydrogen atoms or monovalent substituents, such as alkyl groups (e. g., methyl, ethyl, etc.) or hydroxyl groups and may be the same or different, or Y and Z together represent the atoms necessary to complete a benzene ring, and R represents a hydrogen atom or an alkyl group, such as methyl, carboxymethyl, ethyl, propyl, butyl, etc., especially an alkyl group containing from 1 to 4 carbon atoms, or a basic substituent, such as ammonium or substituted ammonium (organic amino), or a metal, such as sodium, potassium, silver, etc. When Y and Z represent a benzene ring, this ring can bear substituents, such as methyl, ethyl, chlorine, methoxyl, ethoxyl, hydroxyl, amino, etc.

It is, therefore, an object of our invention to provide new 1:2:4-triazole-3-thiol compounds. Another object is to provide a method for making these new compounds. Other objects will become apparent from a consideration of the following description and examples.

The compounds of Formula I above wherein R represents a hydrogen atom can be made directly and in excellent yields by heating ammonium or organic base salts of the general formula:

(II)
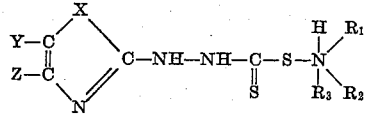

wherein X, Y and Z each have the values given above, and $R_1$, $R_2$ and $R_3$ each represents a hydrogen atom or a monovalent aliphatic group, such as methyl, ethyl, etc. (especially a lower alkyl group), or $R_1$ and $R_2$ can together represent the non-metallic atoms necessary to complete a heterocyclic ring, such as a pyridine ring, quinoline ring, etc. (which can also have substituents thereon of the type indicated above) when $R_3$ represents a double bond.

Exemplary of the organic base salts represented by Formula II above are the pyridinium, quinolinium, triethylammonium, triethanolammonium, etc., salts.

The β-substituted dithiocarbazic acids, of which compounds of general Formula II are the ammonium or substituted ammonium salts, can readily be made by the reaction of carbon disulfide upon hydrazines of the general formula:

(III)
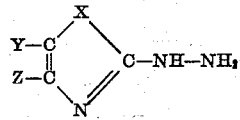

It is known that carbon disulfide reacts with compounds containing the hydrazine group to give β-substituted dithiocarbazic acids. (Fischer, Ann. 190, 114 (1878); 212, 316 (1882); J. A. C. S., 65, 1300–1 (1943)).

The reaction of compounds of the general Formula III with carbon disulfide can be carried out at room temperature in the presence of ammonia or an organic base, e. g., pyridine, quinoline, triethylamine, triethanolamine, tripropylamine, N-methylpiperidine, etc., to give the compounds of Formula II. The reaction mixture can then be heated without isolation of the ammonium salt to give the compounds of general Formula I, upon pouring the reaction mixture into water. Heating on a steam bath is sufficient to eliminate hydrogen sulfide and effect ring closure to form the triazole ring, although lower temperatures, e. g., 50° C., can be used.

Alternatively, the compounds of Formula III can be heated in the presence of carbon disulfide and ammonia, an organic base of the type mentioned above, or a strong inorganic alkaline material, such as an alkali metal hydroxide (e. g., potassium hydroxide, sodium hydroxide, etc.), to produce directly the compounds of Formula I. When the reaction is carried out in the presence of a strong inorganic base, such as sodium hydroxide, the compounds of Formula I wherein R represents an alkali metal atom are formed. If desired, they can be converted to the free mercapto compounds by acidification with a strong acid, such as hydrochloric acid, sulfuric acid, etc.

The condensations of the compounds of Formula III with carbon disulfide can be carried out in the presence of water, or a polar organic solvent, such as methanol, ethanol, etc. (e. g., a lower alcohol). We have found that aqueous alkali gives particularly high yields in a short period of time.

Compounds of general Formula I wherein R represents an alkyl group can be readily made by alkylation of those compounds wherein R represents a hydrogen atom. Alkylation can be effected by heating the free mercapto compounds together with an alkyl ester or salt, such as methyl iodide, ethyl iodide, etc., and an alkali, such as sodium hydroxide, potassium hydroxide, etc.

Metal salts, such as the silver salt can be prepared by contacting the alkali metal salts of the compounds of Formula I with an aqueous solution of an inorganic metal salt, such as silver nitrate. The heavier metal salts spontaneously precipitate under such conditions, since they are generally more insoluble in water than the corresponding alkali metal salts.

The organic bases useful in practicing our invention, such as those exemplified above, include the trialkylamines, N-alkylpiperidines, N,N-dialkylanilines, azines, etc. Pyridine is quite outstanding in the process of our invention.

The products obtained in our invention are thiols and it is to be understood that this term includes not only the free thiol or mercapto group, but also metal salts of this group, as well as the alkyl ethers of said group.

The 1:2:4-triazole-3-thiols of our invention, including those compounds represented by Formula I above, can be used for the purpose of inhibiting the formation of fog or prevention of plumming during the hot glazing or ferrotyping of photographic prints. Such emulsions are described in the copending application Serial No.

655,472 of Leslie A. Williams, filed on even date herewith.

The 1:2:4-triazole-3-thiol compounds of our invention which have been found to be particularly useful comprise the compounds represented by the following general formula:

(IV)
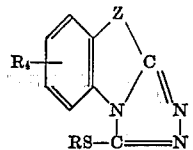

wherein R has the values given above, Z represents vinylene or alkyl vinylene, an oxygen atom, a sulfur atom, or a —NH— group, and $R_4$ represents a hydrogen atom, or a substituent, such as methyl, ethyl, chlorine, methoxyl, ethoxyl, hydroxyl, amino, etc. The necessary hydrazines to prepare such compounds have been previously disclosed in the prior art, such as in Bayer et al. U. S. Patent 2,073,600, issued March 16, 1937.

The following examples will serve to illustrate more fully the manner of preparing the novel 1:2:4-triazole-3-thiol compounds of our invention.

*Example 1.—2':3'-dihydrobenzothiazolo-3':2':4:5-triazole-(1:2:4)-3-thiol*

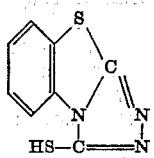

2-benzthiazolylhydrazine (8.25 gms., 0.05 mol.) was suspended in pyridine (64 cc.) and to the suspension at room temperature carbon disulfide (3.8 gms., 0.05 mol.) was added. The mixture was shaken at room temperature until solution was complete (ca. 15 mins.) after which the solution was heated on the steam-bath until the evolution of hydrogen sulfide (ca. 30 min.), which commenced at about 50° C., ceased. The hot solution was poured with stirring into water (500 cc.) and the precipitate collected after chilling. The product was purified by the charcoal treatment of it in a boiling solution of sodium carbonate, filtering, cooling the filtrate and acidifying with concentrated hydrochloric acid. Yield 9 gms., M. P. 243° C.

*Example 2.—1':2' - dihydroquinolino - 1':2':4:5 - triazole-(1:2:4)-3-thiol*

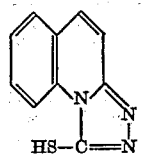

2-quinolylhydrazine (8 gms.) was dissolved in pyridine (63 cc.) and to the solution at room temperature carbon disulfide (3.8 gms.) was added and the yellow solution shaken for 15 minutes at room temperature. The solution was then heated on the steam-bath until the evolution of hydrogen sulfide ceased (ca. 45 min.). After pouring the hot solution into water and chilling, the product was collected and purified as in Example 1 to give 8.5 gms. of product, M. P. 265-266° C.

*Example 3.—2':3'-dihydrobenzoxazolo-3':2':4:5-triazole-(1:2:4)-3-thiol*

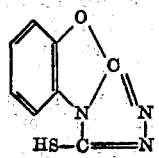

2-benzoxazolylhydrazine (7.5 gms.) was suspended in pyridine (56 cc.) and the suspension treated with carbon disulfide (3.8 gms.). The suspension was shaken at room temperature until solution was complete (ca. 15 mins.), after which the solution was heated on the steam-bath until no more hydrogen sulfide was evolved (ca. 30 mm.). The product was precipitated by pouring the hot solution into water and was purified as in Example 1 to give 3.5 gms. of product, M. P. 256-257° C.

*Example 4.—4-hydroxy-3-mercapto-6-methyl-1:2:3a:7-tetraazaindene*

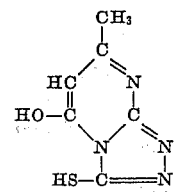

2-hydrazino-4-hydroxy-6-methylpyrimidine (14 gms.) was dissolved in a dilute solution of sodium hydroxide (4 gms. in 40 cc. water) and to this solution pyridine (70 cc.) was added, followed by carbon disulfide (7.6 gms.). The mixture was shaken for 5 minutes during which time a yellow color developed. The solution was heated on the steam-bath for 1¼ hours. During the heating a flocculent precipitate of the sodium salt was formed and hydrogen sulfide was evolved. The suspension was poured into water with stirring until the precipitate had dissolved. On acidification with conc. hydrochloric acid the product precipitated. It was collected and purified as in Example 1. Yield 14 gms. of an amorphous powder, M. P. 280° C. (dip.).

While all of the evidence presently available indicates that the product of Example 4 has the formula given above, it is possible that this compound might be the isomeric 6-hydroxy-3-mercapto-4-methyl-1:2:3a:7-tetraazaindene.

*Example 5.—6-chloro-2-hydrazinoquinoline*

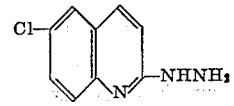

2:6 dichloroquinoline (1 mol) was refluxed for 3 hours with 100% hydrazine hydrate (5 mols). On cooling crystals separated which were recrystallized from water (charcoal being added to the solution prior to filtration) as almost colourless crystals, M. P. 185°.

*Example 6.—1':2 - dihydro - 6' - chloroquinolino - 1':2'-5:4 - triazole (1:2:4) - 3 thiol*

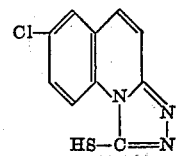

6 - chloro - 2 - hydrazinoquinoline (1 mol) was dissolved in pyridine (6 cc./g.) and to the solution carbon disulphide (1 mol) was added. After shaking to ensure complete mixing the solution was heated on the steam bath until the evolution of hydrogen sulphide had ceased. After cooling the pyridine solution it was poured into water and the resulting solid collected and purified by carbonate and charcoal as in previous examples to give an amorphous powder, M. P. 298°, believed to be the required thiol.

*Example 7.—1':2' - dihydro - 6' - methylquinolino - 1':2'- 5:4 - thiazole (1:2:4) - 3 thiol*

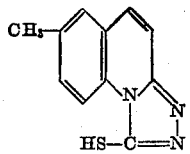

2 hydrazine - 6 - methylquinoline (1 mol) was dissolved in pyridine (6 cc./g.) and to the solution carbon disulphide (1 mol) was added. The resulting yellow solution was heated on the steam bath until the evolution of hydrogen sulphide had ceased. It was poured into an excess of water and the solid which separated was collected and purified as in previous examples to give an amorphous colourless compound M. P. 295–296° (dec.).

*Example 8.—1':2' - dihydro - 4'-methylquinolino - 1':2'- 5:4 - thiazole (1:2:4) - 3 thiol*

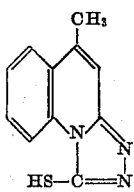

2 - hydrazino - 4 - methylquinoline (13.4 g.) was suspended in pyridine (5 cc./g.) and to this carbon disulphide (5.9 g.) was added and the mixture shaken for 5 min. to give a clear solution. The solution was heated on the steam bath until there was no further evolution of hydrogen sulphide. The solution was poured with stirring into water (in 200 cc.), and the product collected dried and purified with sodium carbonate as in previous examples to give 11 grams of product M. P. 298°.

What we claim as our invention and desire secured by Letters Patent of the United States is:

1. A method for making 1:2:4 - triazole - 3 - thiol compounds comprising intermixing a compound selected from those represented by the following general formula:

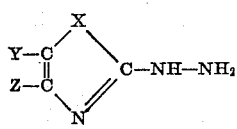

wherein X represents a member selected from the group consisting of a vinylene group, a sulfur atom, an oxygen atom, a —NH— group, and a —CR'=N— group wherein R' represents a member selected from the group consisting of a hydrogen atom and an alkyl group, and Y and Z each represents a member selected from the group consisting of a hydrogen atom, an alkyl group, an hydroxyl group, and Y and Z together represent the atoms necessary to complete a benzene ring, together with carbon disulfide, and heating the resulting β-substituted dithiocarbazic acid in the presence of a basic compound selected from the group consisting of ammonia and an organic amine to produce the desired thiol.

2. A method for making 1:2:4-triazole-3-thiol compounds comprising heating the compounds selected from those represented by the following general formula:

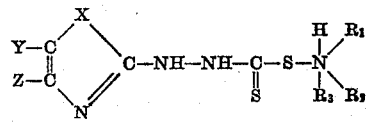

wherein X represents a member selected from the group consisting of a vinylene group, a sulfur atom, an oxygen atom, a —NH— group, and a —CR'=N— group wherein R' represents a member selected from the group consisting of a hydrogen atom and an alkyl group, and Y and Z each represents a member selected from the group consisting of a hydrogen atom, an alkyl group, an hydroxyl group, and Y and Z together represent the atoms necessary to complete a benzene ring, and $R_1$, $R_2$ and $R_3$ each represents a member selected from the group consisting of a hydrogen atom, a lower alkyl group, and $R_1$ and $R_2$ together represent the non-metallic atoms necessary to complete a heterocyclic ring when $R_3$ represents a double bond.

3. A method according to claim 2 wherein $R_1$ and $R_2$ together represent the non-metallic atoms necessary to complete a pyridine ring and $R_3$ represents a double bond in the 1-position of said pyridine ring.

4. A method for making 2':3' - dihydrobenzothiazolo- 3':2':4:5 - triazole (1:2:4) - 3 - thiol comprising intermixing 2-benzthiazolylhydrazine with carbon disulfide in the presence of pyridine and heating the reaction mixture until a substantial quantity of hydrogen sulfide has been evolved.

5. A method for making 1':2' - dihydroquinolino- 1':2':4:5 - triazole(1:2:4) - 3 - thiol comprising intermixing 2 - quinolylhydrazine with carbon disulfide in the presence of pyridine and heating the reaction mixture until a substantial quantity of hydrogen sulfide has been evolved.

6. A method for making 2':3' - dihydrobenzoxazolo- 3':2':4:5 - triazole(1:2:4) - 3 - thiol comprising intermixing 2 - benzoxazolylhydrazine with carbon disulfide in the presence of pyridine and heating the reaction mixture until a substantial quantity of hydrogen sulfide has been evolved.

7. A method for making 4 - hydroxy - 3 - mercapto - 6- methyl - 1:2:3a:7 - tetraazaindene comprising intermixing 2 - hydrazino - 4 - hydroxy - 6 - methylpyrimidine with carbon disulfide in the presence of pyridine and heating the reaction mixture until a substantial quantity of hydrogen sulfide has been evolved.

References Cited in the file of this patent

Marchwald: Ber. Deut. Chem., vol. 33 (1900), pages 1885–1899.

UNITED STATES PATENT OFFICE
Certificate of Correction

Patent No. 2,861,076                                                                    November 18, 1958

Edward Bowes Knott et al.

It is hereby certified that error appears in the above numbered patent requiring correction and that the said Letters Patent should read as corrected below.

In the heading to the printed specification, line 9, date of priority, for "June 14, 1956" read —June 4, 1956—; column 4, line 56, Example 6, for "*1':2-dihydro*" read —*1':2'-dihydro*—.

Signed and sealed this 14th day of April 1959.

[SEAL]

Attest:
KARL H. AXLINE,
*Attesting Officer.*

ROBERT C. WATSON,
*Commissioner of Patents.*